(12) United States Patent
Suenaga et al.

(10) Patent No.: US 9,291,753 B2
(45) Date of Patent: Mar. 22, 2016

(54) DIFFRACTION OPTICAL ELEMENT AND PRODUCTION METHOD THEREFOR

(75) Inventors: Tatsutoshi Suenaga, Osaka (JP); Yuka Okada, Hyogo (JP); Akiko Murata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 625 days.

(21) Appl. No.: 13/805,482

(22) PCT Filed: Feb. 15, 2012

(86) PCT No.: PCT/JP2012/000985
§ 371 (c)(1),
(2), (4) Date: Dec. 19, 2012

(87) PCT Pub. No.: WO2012/164781
PCT Pub. Date: Dec. 6, 2012

(65) Prior Publication Data
US 2013/0088781 A1    Apr. 11, 2013

(30) Foreign Application Priority Data

May 30, 2011  (JP) ................................. 2011-120249

(51) Int. Cl.
*G02B 5/18* (2006.01)
*G02B 27/46* (2006.01)
*B29D 11/00* (2006.01)

(52) U.S. Cl.
CPC ............ *G02B 5/18* (2013.01); *B29D 11/00269* (2013.01); *B29D 11/00769* (2013.01); *G02B 5/1847* (2013.01); *G02B 5/1876* (2013.01); *G02B 27/46* (2013.01)

(58) Field of Classification Search
CPC .......... G02B 3/08; G02B 5/18; G02B 5/1804; G02B 5/1814; G02B 5/1819; G02B 5/1866; G02B 5/1871; G02B 5/188; G02B 5/1885; G02B 5/189; G02B 5/147; G02B 5/1876; G02B 27/46; B29D 11/00269; B29D 11/00769; G11B 7/1353

USPC ......... 359/558, 566, 567, 568, 569, 571, 573, 359/574, 575, 576, 742, 743
See application file for complete search history.

(56) References Cited

U.S. PATENT DOCUMENTS

| 5,561,558 | A | 10/1996 | Shiono et al. |
| 2009/0053656 | A1 | 2/2009 | Yanagisawa |
| 2009/0168205 | A1 | 7/2009 | Inoue |
| 2010/0110548 | A1 | 5/2010 | Korenaga et al. |

(Continued)

FOREIGN PATENT DOCUMENTS

| CN | 101405629 A | 4/2009 |
| CN | 101965529 A | 2/2011 |

(Continued)

OTHER PUBLICATIONS

International Search Report for corresponding International Application No. PCT/JP2012/000985 mailed May 22, 2012.

(Continued)

*Primary Examiner* — Kimberly N Kakalec
(74) *Attorney, Agent, or Firm* — Renner, Otto, Boisselle & Sklar, LLP

(57) ABSTRACT

In a diffraction optical element having a structure in which a base and an optical adjustment layer adhere to each other, defects such as cracks and peeling occur in the optical adjustment layer, when the adhesive strength between the base and the optical adjustment layer is degraded. In a diffraction optical element 100 of the present invention, a plurality of anchor grooves 3 are formed in a planar second region 6 of a base 1. Further, a depth of an anchor groove of the plurality of anchor grooves 3, which is positioned on an outermost side, is designed so as to be smaller than a depth of another anchor groove of the plurality of anchor grooves 3, which is positioned on an innermost side. An optical adjustment layer 9 adheres so as to cover a first region 5 in which a diffraction grating 2 is formed and the second region 6 in which the anchor grooves 3 are formed of the base 1.

11 Claims, 9 Drawing Sheets

(56) References Cited

U.S. PATENT DOCUMENTS

| | | |
|---|---|---|
| 2010/0134889 A1* | 6/2010 | Takayama ..................... 359/576 |
| 2010/0157777 A1* | 6/2010 | Mizuno ..................... 369/112.05 |
| 2010/0246008 A1* | 9/2010 | Murata et al. ................. 359/576 |

FOREIGN PATENT DOCUMENTS

| | | |
|---|---|---|
| JP | 07-113907 A | 5/1995 |
| JP | 2007-168087 A | 7/2007 |
| JP | 2007-168097 A | 7/2007 |
| JP | 2007-293951 A | 11/2007 |
| JP | 2009-053271 A | 3/2009 |
| JP | 2010-102000 A | 5/2012 |

OTHER PUBLICATIONS

Chinese Search Report dated Apr. 4, 2014 for corresponding Chinese Application No. 201280001462.4 and English translation.

* cited by examiner (a)

(b)

(a)

(b)

(c)

DIFFRACTION OPTICAL ELEMENT AND PRODUCTION METHOD THEREFOR

TECHNICAL FIELD

The present invention relates to a diffraction optical element and a production method therefor. In particular, the present invention relates to a diffraction optical element including an optical adjustment layer on a surface of a lens base, in which wavelength dependence of diffraction efficiency is reduced, and to a production method therefor.

BACKGROUND ART

A diffraction optical element is an optical element including a number of grating structures on a surface of a base formed of an optical material such as glass or resin.

The diffraction optical element is used in various optical systems, and for example, those which are used as a lens designed so as to collect diffraction light of a particular order into one point, a spatial low-pass filter, a polarization hologram, and the like are known.

The diffraction optical element has a feature in which an optical system can be made compact.

Further, unlike refraction, light with a longer wavelength expresses diffraction more greatly, and hence, chromatic aberration and field curvature of an optical system can be corrected by combining a diffraction optical element with an optical element of a refraction system.

On the other hand, in the above-mentioned diffraction optical element, the diffraction efficiency ideally depends on the wavelength of light. Therefore, when a diffraction optical element is designed so that the diffraction efficiency becomes optimum with light having a particular wavelength, there is a problem in that the diffraction efficiency is degraded at the other wavelengths. For example, in the case where an attempt is made so as to apply a diffraction optical element to an optical system utilizing white light, such as a lens for a camera, there is a problem in that there is a limit in application of the diffraction optical element alone.

In order to solve the above-mentioned problem, Patent Document No. 1 discloses a diffraction optical element of a phase difference type, including a base made of an optical material, the base having a surface on which a diffraction grating is provided, and an optical adjustment layer made of an optical material different from that of the base, for covering the diffraction grating.

In the diffraction optical element of a phase difference type, in the case where a wavelength of light passing through the diffraction optical element is $\lambda$, and a depth of the diffraction grating is d, when the following Expression (1) is satisfied, m-order diffraction efficiency with respect to light having a wavelength $\lambda$ is 100%.

$$d = \frac{m\lambda}{|n1(\lambda) - n2(\lambda)|} \quad (1)$$

where m is an integer, representing a diffraction order.

Therefore, when an optical material having a refractive index $n1(\lambda)$ and having such wavelength dependence that d becomes almost constant in a wavelength band of light to be used can be combined with an optical material having a refractive index $n2(\lambda)$, the wavelength dependence of diffraction efficiency can be reduced. In general, a material having a high refractive index and low wavelength dispersion is combined with a material having a low refractive index and high wavelength dispersion. Patent Document No. 1 discloses that a resin is used as an optical material constituting a base, and a UV-curable resin is used as an optical material constituting an optical adjustment layer.

In such a diffraction optical element of a phase difference type, the optimization of optical characteristics is required. On the other hand, a base and an optical adjustment layer having not a little difference in properties are joined to each other, and hence, the optimization in structure for efficient adhesion is also required.

Patent Document No. 1 also discloses, as means for enhancing adhesive strength, a method of providing a concentric circular protruding portion in which a diffraction zone is matched with an axis center in a planar second region surrounding a first region in which a diffraction grating is formed and forming an optical adjustment layer so as to cover the protruding portion, thereby increasing a contact area between the base and the optical adjustment layer and enhancing the adhesive strength.

CITATION LIST

Patent Literature

Patent Document No. 1: Japanese Patent Application Laid-Open Publication No. 2010-102000

SUMMARY OF INVENTION

Technical Problem

According to the investigation by the inventors of the present application, it was found that there is a case in which the adhesive strength is not sufficient even when the protruding portion (convex portion) is provided in the planar second region as described in Patent Document No. 1.

The present invention provides a diffraction optical element in which the adhesive strength between a base and an optical adjustment layer is enhanced, and is capable of preventing cracks caused by peeling of the optical adjustment layer from the base and separation of the optical adjustment layer.

Solution to Problem

According to the present invention, there is provided a diffraction optical element including: a base made of a first optical material containing a first resin, the base having a diffraction grating shape on a surface thereof; and an optical adjustment layer made of a second optical material containing a second resin, the optical adjustment layer being formed on the diffraction grating shape of the base, in which the base includes a first region having the diffraction grating shape on a surface thereof, and a second region positioned outside the first region, in which the optical adjustment layer is formed so as to cover the first region and at least a part of the second region, in which the second region has a plurality of anchor grooves formed therein, and in which a depth of an anchor groove of the plurality of anchor grooves, which is positioned on an outermost side, is smaller than a depth of another anchor groove of the plurality of anchor grooves, which is positioned on an innermost side.

According to an exemplary embodiment of the present invention, in the plurality of anchor grooves, the anchor groove positioned on the innermost side is deepest, and anchor grooves positioned on an outer side become shallower.

According to an exemplary embodiment of the present invention, a depth of a deepest anchor groove of the plurality of anchor grooves is 0.05 mm or less.

According to an exemplary embodiment of the present invention, the plurality of anchor grooves each have a concentric shape in which an axis center thereof substantially matches with an axis center of the diffraction grating shape.

According to an exemplary embodiment of the present invention, a part of a surface of the second region has a planar shape, and a cross-sectional shape of a surface of the optical adjustment layer has substantially the same shape as an envelope curve connecting tip ends of diffraction step differences of the diffraction grating shape in the first region and has a substantially planar shape along a shape of the base in the second region.

According to an exemplary embodiment of the present invention, the optical adjustment layer has such a thickness that a length from an envelope curve connecting tip ends of diffraction step differences of the diffraction grating shape to a surface of the optical adjustment layer in a normal direction is 0.05 mm or less.

According to an exemplary embodiment of the present invention, the first optical material is a material having a lower refractive index and higher dispersion as compared with the second optical material.

According to an exemplary embodiment of the present invention, the second optical material is a composite material containing a resin and inorganic particles.

According to an exemplary embodiment of the present invention, the inorganic particles contain, as a main component, at least one kind of oxide selected from the group consisting of zirconium oxide, yttrium oxide, lanthanum oxide, alumina, and silica.

According to the present invention, there is provided a method of producing a diffraction optical element including a base made of a first optical material containing a first resin, the base having a diffraction grating shape on a surface thereof, and an optical adjustment layer made of a second optical material containing a second resin, the optical adjustment layer being formed on the diffraction grating shape of the base, the method including the steps of: preparing the base including a first region having the diffraction grating shape on a surface thereof, and a second region positioned outside the first region, the second region having a plurality of anchor grooves formed therein, a depth of an anchor groove of the plurality of anchor grooves, which is positioned on an outermost side, being smaller than a depth of another anchor groove of the plurality of anchor grooves, which is positioned on an innermost side; dropping a raw material of the second optical material to a mold for causing the second optical material to adhere to the base; bringing the base into close contact with the mold so as to sandwich the second optical material; and curing the raw material of the second optical material while keeping the base in close contact with the mold.

According to an exemplary embodiment of the present invention, the raw material of the second optical material is light-curable, and the curing the raw material of the second optical material is carried out by irradiation of light.

According to an exemplary embodiment of the present invention, the raw material of the second optical material is UV-curable, and the curing the raw material of the second optical material is carried out by irradiation of UV-light.

Advantageous Effects of Invention

According to the present invention, in the plurality of anchor grooves formed in the second region of the base, the depth of the anchor groove positioned on the outermost side is smaller than that of the anchor groove positioned on the innermost side. This can substantially enhance the adhesive strength between the base and the optical adjustment layer. Therefore, crack defects caused by separation of the optical adjustment layer occurring in the course of production can be suppressed, and productivity can be enhanced remarkably. Further, a highly reliable diffraction optical element can be provided, in which separation of the optical adjustment layer from the base, which proceeds gradually from an end of the optical adjustment layer due to a change in environment, long-term use, and the like, can be prevented.

DESCRIPTION OF EMBODIMENTS

The inventors of the present application studied, in detail, cracks generated in an optical adjustment layer in a diffraction optical element in which the optical adjustment layer containing a composite material as a raw material was formed on the surface of a base having a diffraction grating shape and studied, in detail, peeling of the optical adjustment layer from the base. Consequently, it was found that, in the case where the optical adjustment layer was formed so as to cover a first region having a diffraction grating shape formed on the surface of the base and a part of a second region surrounding the first region, cracks of the optical adjustment layer originating from a plane portion of the second region, and interface peeling between the base and the optical adjustment layer occurring at an end of the first region occurred at a high probability.

Based on the above-mentioned finding, the inventors of the present application came up with a diffraction optical element described below.

Specifically, a plurality of anchor grooves were formed in the plane portion of the second region, and the optical adjustment layer was allowed to adhere so as to cover the first region and the anchor grooves of the second region. This can enhance adhesive strength of the base and the optical adjustment layer through an effect of the anchor grooves, and prevent peeling of the optical adjustment layer in the second region. Further, enhancing the adhesive strength is also effective as measures against cracks because micromotion of the optical adjustment layer at the interface between the base in the second region can be suppressed.

Embodiments of the present invention are described hereinafter with reference to the drawings.

First Embodiment

Figure 1:
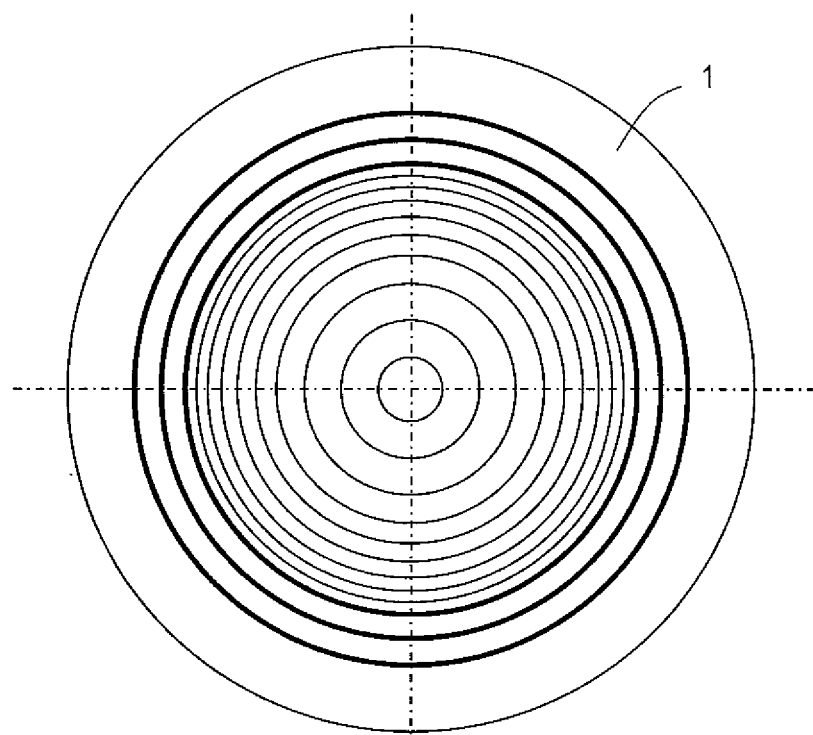
FIGS. 1(a) and 1(b) are views each illustrating a base of a diffraction optical element according to an embodiment of the present invention.
Figure 1:
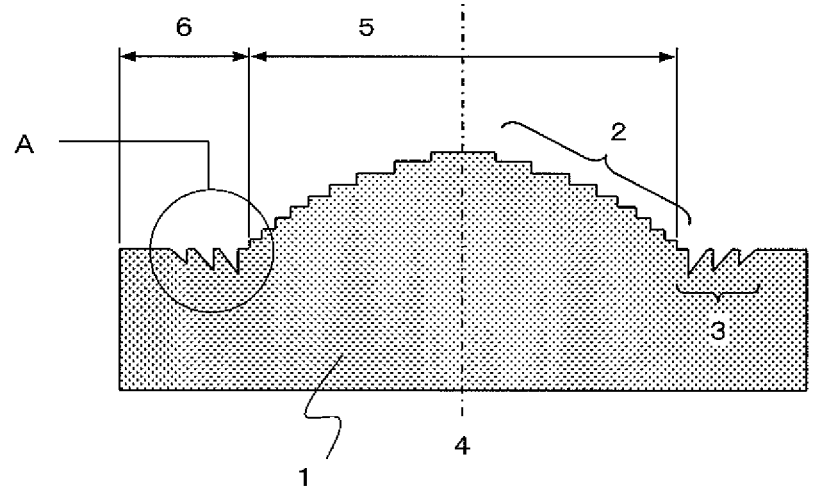
Figure 2:
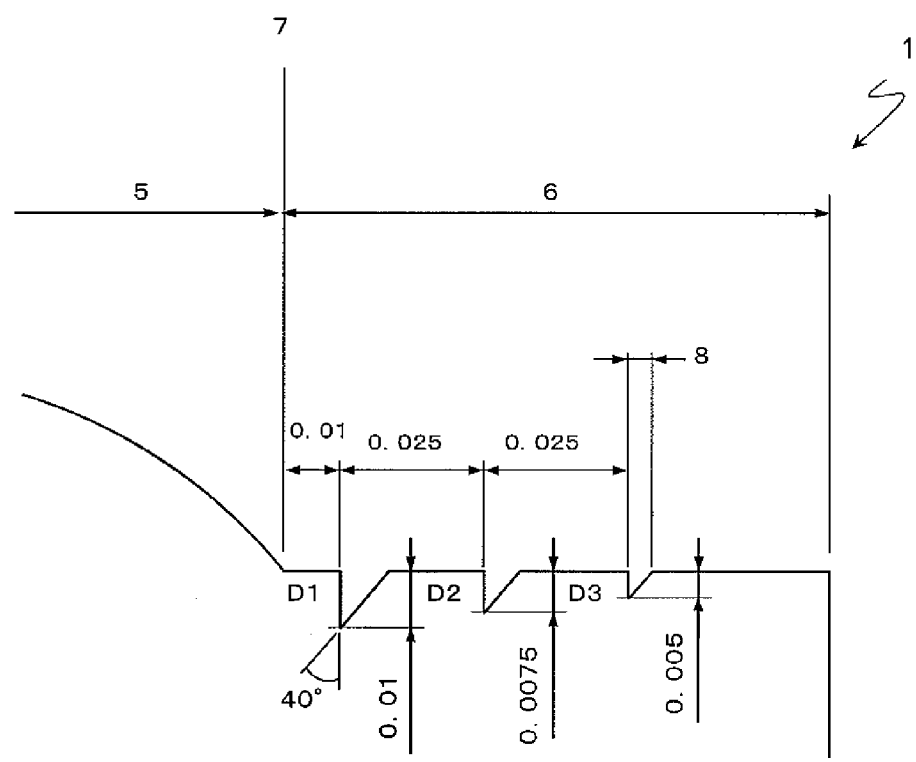
FIG. 2 is a diagram illustrating the base of the diffraction optical element according to the embodiment of the present invention.

FIGS. 1 and 2 are views illustrating a base 1 of a diffraction optical element according to a first embodiment of the present invention.

FIG. 1(a) is a top view of the base 1 having a surface on which a diffraction grating 2 and anchor grooves 3 are formed, and FIG. 1(b) is a side cross-sectional view of the base 1.

The base 1 made of a first optical material containing a first resin includes the diffraction grating 2 and the anchor grooves 3 on its surface. The diffraction grating 2 and the anchor grooves 3 are formed so that formation axis centers 4 thereof substantially match with each other.

A first region 5 having a surface on which the diffraction grating 2 is formed includes a convex cross-sectional shape having a lens function. In a second region 6 having a planar shape, which is positioned outside the first region 5 and surrounds the first region 5, the plurality of anchor grooves 3 are formed. In the first embodiment, although the cross-sectional shape of the first region 5 has a convex shape, the present invention is not limited thereto and the cross-sectional shape of the first region 5 may have a concave shape. Further, although the anchor grooves 3 have, for example, a concentric shape in which their axis centers substantially match with that of the diffraction grating 2 formed in the first region 5, the present invention is not limited thereto.

The anchor grooves 3 have a recessed shape with respect to the planar shape of the second region 6 of the base 1. The base 1 does not have a protruding shape with respect to the planar shape in the second region 6.

As the first optical material, any material can be used as long as the first optical material holds a relationship of Expression (2) with respect to a second optical material and a depth d of a diffraction grating in an entire wavelength region to be used and has sufficient transmittance as an optical element.

$$0.9d \leq \left| \frac{m \cdot \lambda}{n1(\lambda) - n2(\lambda)} \right| \leq 1.1d \quad (2)$$

n1(λ): refractive index at wavelength λ of first optical material n2(λ): refractive index at wavelength λ of second optical material m: diffraction order Considering ease of processing and a selection range of the second optical material (described later), the first optical material constituting the base 1 in the first embodiment contains a resin.

The reason why a material containing a resin is used as the first optical material is as follows: in the case of considering molding in which productivity can be expected most in the production of a lens, durability of a mold is deteriorated remarkably compared with a resin in a material containing glass, and hence, the production of the base 1 having a diffraction grating shape is not easy; in contrast, a material containing a resin can adopt a production method having high mass-productivity such as injection molding. Further, a material containing a resin can be easily subjected to minute processing by molding or other processing methods, and hence, there is an advantage in that the material containing a resin can easily handle a change in shape of a pitch of the diffraction grating 2 and a diffraction step difference (not shown). Further, the material containing a resin is also advantageous for reduction in size and weight of a diffraction optical element.

FIG. 2 is a diagram of an enlarged A portion illustrated in FIG. 1(b), and illustrates the anchor grooves 3 in detail. Although the case where the number of the anchor grooves is three is described in the first embodiment, the present invention is not limited thereto.

In FIG. 2, the three anchor grooves 3 are denoted by D1, D2, and D3, respectively, from a side close to the first region 5 (that is, an inner circumferential side). The depth of the anchor groove D3 positioned on the outermost side is smaller than that of the anchor groove D1 positioned on the innermost side.

In the example illustrated in FIG. 2, the anchor grooves D1, D2, and D3 vary in depth, respectively. The depth of the anchor groove D1 on the innermost side is largest, the depth of the anchor groove D3 on the outermost side is smallest, and the depth of the intermediate anchor groove D2 is in the middle between those of the anchor grooves D1 and D3. Thus, the depth is becoming smaller toward the groove positioned on the outer circumferential side.

When the anchor grooves 3 are filled with the optical adjustment layer 9 (FIG. 5), the contact area between the base 1 and the optical adjustment layer 9 increases, and the adhesive strength thereof is enhanced. From this, it is preferred that the anchor groove is filled with the optical adjustment layer 9 without any gap.

The inventors of the present application studied a relationship between the shape of the anchor grooves 3 and the intrusion amount of the optical adjustment layer 9 in detail.

Consequently, it was found that, as illustrated in FIG. 2, by setting the anchor groove 3 close to the first region 5 side to be deep and setting the anchor grooves 3 to be shallower gradually toward the outer circumferential side, the anchor groove 3 on the outer circumferential side was sufficiently filled with the optical adjustment layer 9.

As a specific example, the groove depth of the anchor groove D1 was set to 0.01 mm, the anchor groove D2 was set to 0.0075 mm, and the anchor groove D3 was set to 0.005 mm. It is desired that the depth of the deepest anchor groove D1 be 0.05 mm or less, and in this example, the depth is set to 0.01 mm.

Further, regarding a formation pitch between grooves, the anchor groove D1 was formed at a position at a distance of 0.01 mm from an interface 7 between the first region 5 and the second region 6 as a reference. Then, the anchor grooves D1 and D2 and the anchor grooves D2 and D3 were formed at a pitch of 0.025 mm, respectively (dimensions are shown). Further, each of the anchor grooves 3 formed this time has a groove shape in which only one side is tilted by 40°.

In the first embodiment, although the number of anchor grooves is three and grooves having a cross-section in a rectangular triangle shape have been described, similar effects are obtained even when the number of anchor grooves is two to five.

As an opening 8 of the anchor groove 3 illustrated in FIG. 2 becomes larger, the amount of a raw material for the optical adjustment layer (described later) which is to fill the anchor groove increases. Therefore, it is desired that the width of the opening 8 be set to 0.05 mm or less. Further, when the opening 8 of the anchor groove 3 is too small, the raw material for the optical adjustment layer cannot intrude the opening 8, and hence, it is preferred that the width of the opening 8 be set to 0.005 mm or more.

Figure 3:
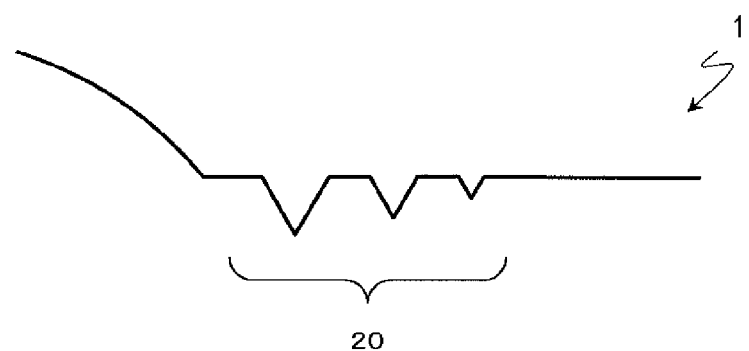
FIGS. 3(a) to 3(c) are diagrams illustrating other examples of anchor grooves according to the embodiment of the present invention.
Figure 3:
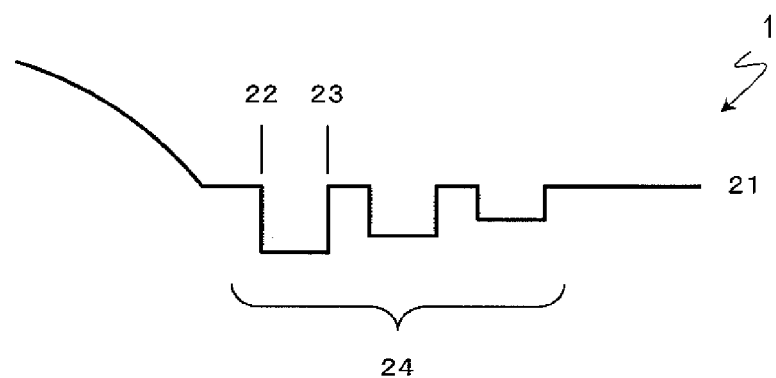
Figure 3:
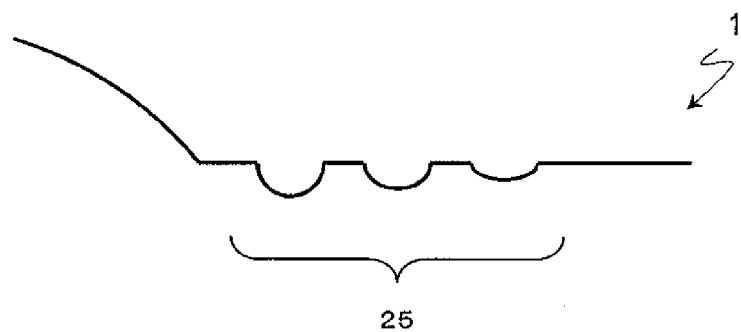

FIGS. 3(a) to 3(c) illustrate anchor grooves having shapes different from the above-mentioned cross-sectional shape, as other examples of the above-mentioned anchor grooves 3.

FIG. 3(a) illustrates anchor grooves 20 having a cross-sectional shape approximate to an inverted equilateral triangle in which two sides tilted in a depth direction cross each other. Even in this configuration, the adhesive strength similar to the above is obtained.

FIG. 3(b) illustrates anchor grooves 24 having a rectangular cross-sectional shape having rising walls 22, 23 at almost 90° with respect to a flat plane 21. Even in this configuration, the adhesive strength similar to the above is obtained.

FIG. 3(c) illustrates anchor grooves 25 having a curved cross-sectional shape with a predetermined curvature. Even in this configuration, the adhesive strength similar to the above is obtained.

Figure 4:
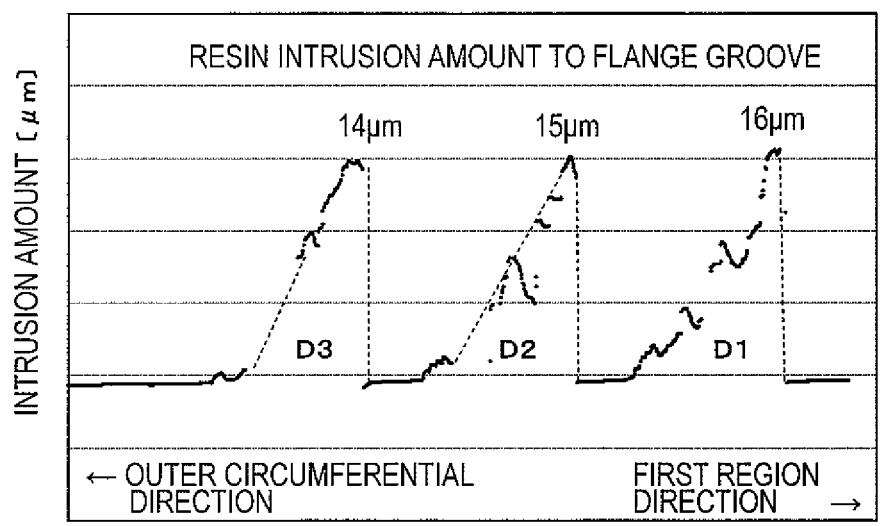
FIG. 4 is a graph showing results obtained by measuring an intrusion amount of an optical adjustment layer into anchor grooves.

FIG. 4 is a graph showing experimental results based on which formation depth of the plurality of anchor grooves 3 are varied from each other. In this experiment, the optical adjustment layer 9 was molded using the base 1 having the three anchor grooves with a uniform depth of 0.016 mm, the optical adjustment layer 9 after molding was peeled from the base 1 and inverted, and a height from a bottom surface to a tip end of a protrusion (intrusion amount to the anchor grooves 3) was actually measured with a laser microscope. Consequently, it is understood that only the anchor groove D1 on the first region 5 side was filled up to a height equal to a groove formation depth, and the optical adjustment layer 9 intruded up to a tip end portion of a bottom of the anchor groove D1 to be cured.

In contrast, in the anchor grooves D2 and D3 on the outer circumferential side, the intrusion amounts to the anchor grooves were 0.015 mm and 0.014 mm, respectively. The intrusion amount decreased gradually, and the anchor grooves were not filled completely. Considering that the maximum adhesive strength is exhibited at a time when the grooves are filled with the optical adjustment layer 9 without any gap, it is considered that the adhesive strength in the anchor grooves D2 and D3 are inferior to that of the anchor groove D1 in such a state.

Thus, in the anchor groove configuration of the first embodiment, insufficient intrusion in amount is eliminated by setting the depths of the anchor grooves to be shallower toward the outer circumferential side.

Figure 5:
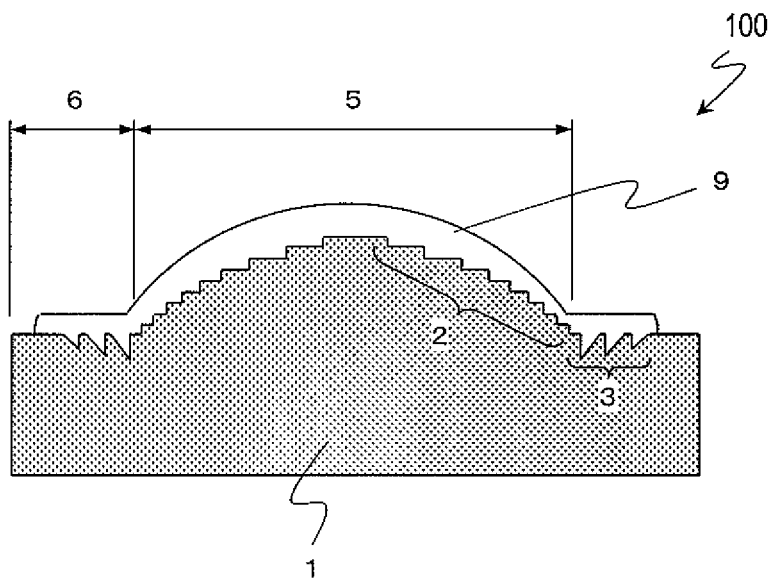
FIG. 5 is a diagram illustrating the diffraction optical element according to the embodiment of the present invention.

FIG. 5 is a side cross-sectional view illustrating a diffraction optical element 100 according to the first embodiment of the present invention. On the base 1 having the diffraction grating 2 and the anchor grooves 3, the optical adjustment layer 9 was molded so as to cover the first region 5 and at least a part of the second region 6 through use of a mold (described later).

Further, the optical adjustment layer 9 in the second region 6 was molded by pressing a raw material for the optical adjustment layer 9 so as to completely fill the anchor grooves 3.

Further, the surface of the optical adjustment layer 9 is a non-spherical shape equal to an envelope curve connecting tip ends of the diffraction step differences of the shape of the diffraction grating 2, and the surface of the optical adjustment layer 9 is formed by transferring a mold shape. Further, a length of the optical adjustment layer 9 up to the surface from the envelope curve in a normal direction (thickness of the optical adjustment layer 9) is set to 0.03 mm or less. When the thickness increases extremely, an aberration increases, and the shape of the surface becomes difficult to control along with the curing and shrinking of a resin. From this, it is preferred that the thickness be set to a depth of the diffraction grating step difference or more to 0.1 mm or less, in particular, 0.05 mm or less. Further, in a planar portion of a part of the surface of the second region 6, the surface of the optical adjustment layer 9 is a substantially planar shape along with the shape of the base.

Further, as a material constituting the optical adjustment layer 9, those which satisfy the relationship of Expression (2) and have sufficient transmittance in a set thickness are used. As the second optical material constituting the optical adjustment layer 9 in the first embodiment, a composite material in which inorganic particles are dispersed in a resin is used. This enables a refractive index and an Abbe number of the second optical material to be adjusted. By using the second optical material having an adjusted appropriate refractive index and Abbe number for the optical adjustment layer 9, diffraction efficiency through all wavelengths in which the diffraction optical element 100 is used can be improved.

Further, by dispersing inorganic particles having a high refractive index in a resin, the second optical material can have a high refractive index that cannot be achieved with a resin alone.

In general, the inorganic particles have a refractive index higher than that of a resin in most cases. Therefore, in the case of using the first optical material containing a first resin for the base 1 and using the second optical material in which inorganic particles are dispersed in a second resin as the optical adjustment layer 9, it is preferred that the second optical material be adjusted so as to exhibit a higher refractive index and lower dispersion compared with those of the first optical material because the number of materials that can be selected as inorganic particles increases. In other words, it is preferred that the first optical material have a lower refractive index and higher dispersion compared with those of the second optical material.

As described above, in the case of using the second optical material made of a composite material as the optical adjustment layer 9, it is necessary that the second optical material have a refractive index higher than that of the first optical material and have dispersion lower than that of the first optical material. Therefore, it is preferred that the inorganic particles to be dispersed in the second resin also contain a material having low dispersion, that is, a high Abbe number as a main component. For example, it is particularly preferred that the inorganic particles contain, as a main component, at least one kind of oxide selected from the group consisting of zirconium oxide (Abbe number: 35), yttrium oxide (Abbe number: 34), lanthanum oxide (Abbe number: 35), hafnium oxide (Abbe number: 32), scandium oxide (Abbe number: 27), alumina (Abbe number: 76), and silica (Abbe number: 68). Further, complex oxides thereof may be used.

In addition to the above-mentioned inorganic particles, inorganic particles and the like exhibiting a high refractive index typified by, for example, titanium oxide and zinc oxide may coexist as long as they satisfy Expression (2) through all wavelengths in which the diffraction optical element 100 is used.

As the first optical material for the base 1, it is preferred to select, for example, a polycarbonate-based resin, poly(methyl methacrylate) (PMMA), an acrylic resin such as an alicyclic acrylic resin, or an alicyclic olefin resin in terms of excellent transmittance. These resins may be copolymerized with other resins, alloyed with other resins, or blended with other resins for the purpose of enhancing moldability, mechanical characteristics, and the like, and at least two kinds of resins instead of one kind of resin may be contained.

As the second optical material for the optical adjustment layer 9, for example, (meth) acrylic resins such as poly(methyl methacrylate), acrylate, methacrylate, urethane acrylate, epoxy acrylate, and polyester acrylate can be used. Further, an epoxy resin, an oxetane resin, or an ene-thiol resin may be used, and polyester resins such as polyethylene terephthalate and polycaprolactone can also be used. Further, a polystyrene resin such as polystyrene, an olefin resin such as polypropylene, a polyamide resin such as nylon, a polyimide resin such as polyimide or polyetherimide, polyvinyl alcohol, a butyral resin, a vinyl acetate resin, or an alicyclic polyolefin resin can also be used. Further, a mixture or a copolymer of these resins may be used, or those which are obtained by organizing these resins may be used.

Second Embodiment

FIGS. 6(a) to 6(d) are views illustrating a method of producing a diffraction optical element according to a second embodiment of the present invention.

Figure 6:
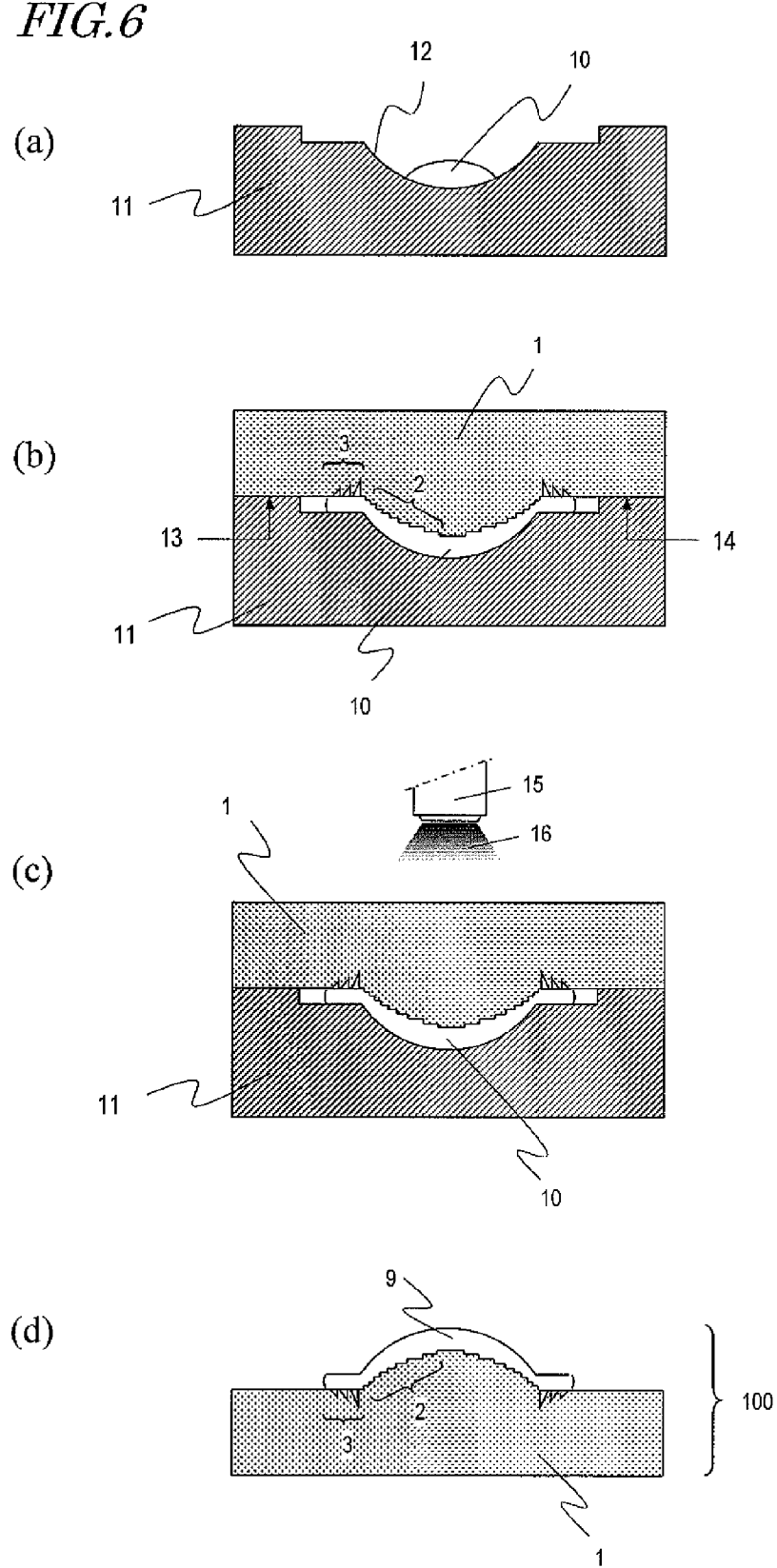
FIGS. 6(a) to 6(d) are views illustrating a method of producing a diffraction optical element according to an embodiment of the present invention.

FIG. 6(a) is a view illustrating a state in which a raw material 10 of the optical adjustment layer 9 is dropped to a mold 11. The raw material 10 of the optical adjustment layer 9 is dropped in a predetermined amount to a curved portion 12 of the mold 11 for regulating a surface shape of the optical adjustment layer 9. At this time, it is desired that the raw material 10 be dropped to the center of the curved portion 12. By using the mold 11, the raw material 10 can adhere to the base 1.

Further, the shape of the curved portion 12 corresponds to a convex lens shape of the diffraction optical element 100. In the case of a concave lens shape, the shape of the mold is also changed to a shape following that lens shape.

Further, when the raw material 10 of the optical adjustment layer 9 is dropped, it is desired that the raw material 10 and a solvent be mixed to lower a viscosity at a time of dropping. For example, in the case of using polycarbonate for the base 1, as such a solvent, an alcohol-based solvent typified by methanol, ethanol, 2-propanol, 1-propanol, and 1-butanol can be used. Further, a glycol-based solvent typified by ethylene glycol and methyl cellosolve, and a solvent such as water can also be used.

FIG. 6(b) is a view illustrating a state in which the base 1 illustrated in FIG. 1 is brought into abutment against the mold 11. The surface of the base 1, which has the diffraction grating 2 and the anchor grooves 3 formed thereon, is opposed to the raw material 10 side of the optical adjustment layer 9. After that, the base 1 is faced down toward the mold 11, and the base 1 is brought into close contact with base abutment surfaces 13, 14 of the mold 11.

Although the base 1 is faced down toward the mold 1 in the second embodiment, the present invention is not limited thereto. Further, in FIG. 6(a), although the raw material 10 of the optical adjustment layer 9 is dropped to the mold 11, even when the raw material 10 is dropped to the surface of the base 1, which has the diffraction grating 2 formed thereon, production can be performed in the same steps.

FIG. 6(c) is a view illustrating the step of curing the raw material 10 of the optical adjustment layer 9. While the base 1 and the mold 11 are kept in close contact with each other, the raw material 10 is irradiated with UV-light 16 from a light source 15 through the base 1 to be cured. The raw material 10 is, for example, light-curable and can be cured by irradiation of light. In this embodiment, the raw material 10 is UV-curable and is cured by irradiation of UV-light.

Further, the mold 11 may be made of a material transmitting a light beam, such as glass, and in this case, the raw material 10 can be cured by irradiating the raw material 10 with a desired light beam through the mold 11. In the case where the raw material 10 is heat-curable, the raw material 10 is cured by application of heat.

FIG. 6(d) is a view illustrating the completed diffraction optical element 100. When the raw material 10 of the optical adjustment layer is cured, and thereafter, the mold 11 is released to remove the base 1, the diffraction optical element 100 is completed, which includes the optical adjustment layer 9 with a curvature regulated by the mold 11 on the surfaces of the base 1, which has the diffraction grating 2 and the anchor grooves 3 formed thereon.

The inventors of the present application produced a diffraction optical element by the above-mentioned production method through use of a base provided with a plurality of convex portions instead of anchor grooves. However, when the completed diffraction optical element was observed with an optical microscope, it was confirmed that light entered the vicinity of an area in which the convex portion was formed and looked luminescent. This is caused by the fact that the raw material 10 was cured while the raw material 10 did not sufficiently fill the vicinity of the convex portion or an area between the convex portions. That is, this means that the adhesion between the optical adjustment layer and the base is insufficient. Further, in the diffraction optical element produced through use of a base provided with convex portions, cracks were generated in the optical adjustment layer at a high probability in the course of production. In such a diffraction optical element, it was also confirmed that ends of the optical adjustment layer floated.

Figure 15:
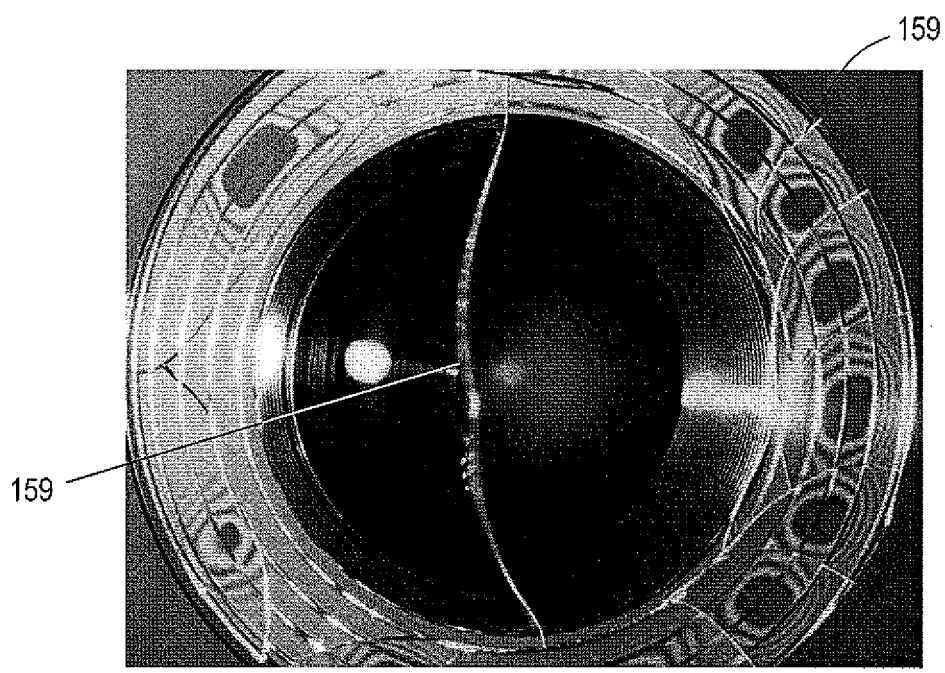
FIG. 15 is a photograph showing a crack occurring in the optical adjustment layer of the diffraction optical element.

FIG. 15 is a photograph obtained by photographing a diffraction optical element produced through use of a base provided with convex portions from above. The employed materials are the same as those described later. It is understood that a large crack 159 is generated in the optical adjustment layer.

Figure 7:
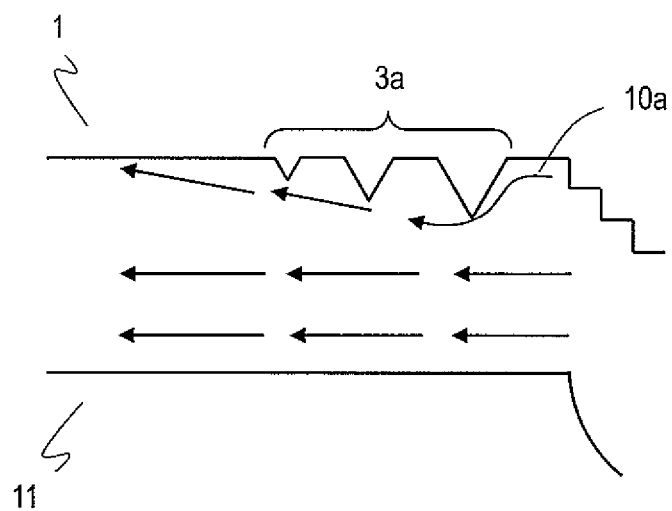
FIG. 7 is a diagram illustrating a flow of a raw material for the optical adjustment layer when a base provided with convex portions instead of concave anchor grooves is brought into abutment against a mold.

FIG. 7 is a diagram illustrating a flow 10a of the raw material 10 when the base 1 provided with convex portions 3a instead of the concave anchor grooves 3 is brought into abutment against the mold 11. The raw material 10 pressed by being sandwiched between the base 1 and the mold 11 flows along the mold 11 from inside to outside. At this time, the flow 10a is blocked by a tip end of the convex portion 3a, and the raw material 10 becomes difficult to fill the area between the convex portions 3a. Therefore, the raw material does not sufficiently fill an area between the convex portions 3a and floats with respect to the base 1. Consequently, the adhesive strength between the base 1 and the optical adjustment layer 9 becomes low.

Figure 8:
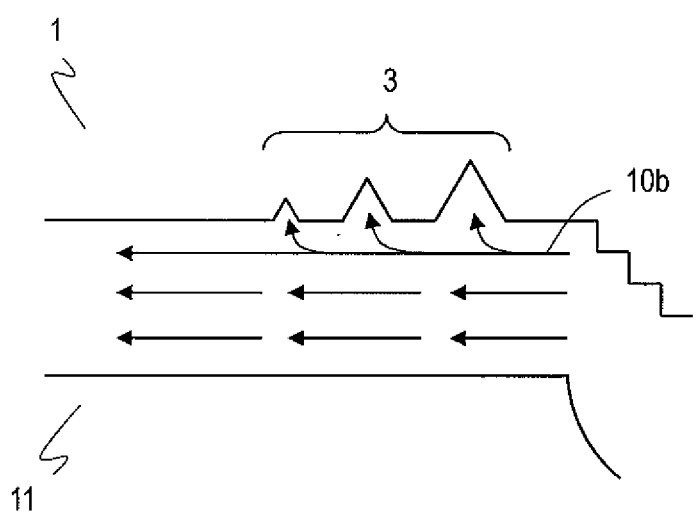
FIG. 8 is a diagram illustrating a flow of a raw material for the optical adjustment layer when a base provided with concave anchor grooves according to the embodiment of the present invention is brought into abutment against a mold.

FIG. 8 is a diagram illustrating a flow 10b of the raw material 10 when the base 1 provided with the concave anchor grooves 3 is brought into abutment against the mold 11. The raw material 10 pressed by being sandwiched between the base 1 and the mold 11 flows along the mold 11 from inside to outside. At this time, the anchor grooves 3 are concave portions, and hence, the anchor grooves 3 do not block the flow of the raw material 10 unlike the convex portions 3a (FIG. 7). The raw material 10 flowing smoothly fills the anchor grooves 3 easily. Further, it is also conceivable that the anchor grooves 3 are filled with the raw material 10 more reliably due to a capillary phenomenon. Accordingly, the anchor grooves 3 are sufficiently filled with the raw material 10, and as a result, the adhesive strength between the base 1 and the optical adjustment layer 9 can be increased.

The adhesive strength of the produced diffraction optical element is hereinafter described. In the following experimental results, the number of diffraction zones separated from the optical adjustment layer 9 (defined as "the number of peeled films") as a result of peeling of the optical adjustment layer 9 from the base was evaluated. Further, in order to accelerate the phenomenon, the diffraction optical element was left in a high-temperature environment at 110° C. for 24 hours and evaluated.

As a resin constituting the base 1, a polycarbonate resin (refractive index of d line: 1.585, Abbe number: 28) was used. As a resin constituting the optical adjustment layer 9, an acrylate resin (refractive index of d line: 1.600, Abbe number: 33) in which a zirconium oxide filler was dispersed was used.

Figure 9:
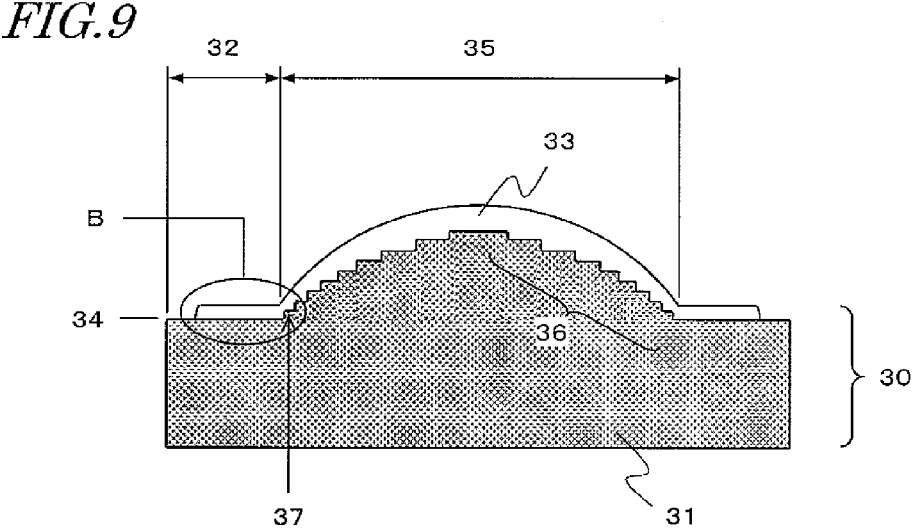
FIG. 9 is a diagram illustrating a diffraction optical element not provided with anchor grooves.
Figure 10:
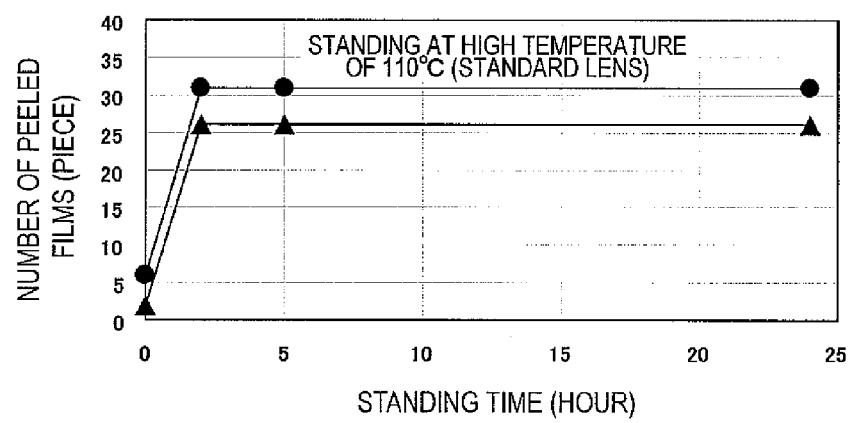
FIG. 10 is a graph showing a transition of the number of peeled films of the diffraction optical element not provided with anchor grooves.
Figure 11:
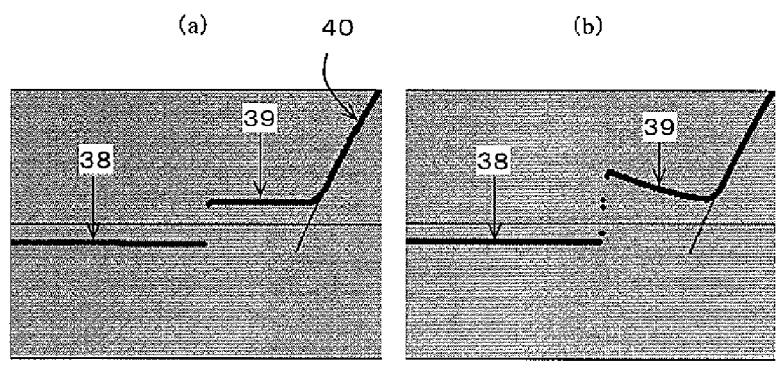
FIGS. 11(a) and 11(b) are diagrams each illustrating a state of the base and the optical adjustment layer in a second region of the diffraction optical element not provided with anchor grooves.

FIGS. 9 to 11 illustrate, as a comparative example, a diffraction optical element 30 with no anchor grooves formed thereon and the transition of the number of peeled films.

FIG. 9 illustrates a cross-sectional shape of the diffraction optical element 30. In the diffraction optical element 30, a base 31 and an optical adjustment layer 33 come into close contact with each other on a plane 34 in a second region 32 of the base 31. When the diffraction optical element 30 is placed in a high-temperature environment, the optical adjustment layer 33 in the second region 32 peel from the base 31 at an interface 34 in a worst case, due to a difference in coefficient of thermal shrinkage between the materials. This phenomenon influences the interface between a diffraction grating 36 and the optical adjustment layer 33 formed on the surface of the first region 35, as well as the second region 32. This influence starts from the diffraction grating 37 close to the second region 32 and proceeds toward a center of the first region 35.

FIG. 10 is a graph evaluating a transition of the number of peeled films that occurred when two samples in each of which diffraction gratings 37 were formed in total on the base 31 were placed in a high-temperature environment. In FIG. 10, a horizontal axis represents a standing time and a vertical axis represents the number of peeled films, and data at a standing time of 0 is the number of peeled films before a standing test.

Regarding the peeling before the standing test, although several numbers of peeling films were recognized in both the samples, both the samples were stable to such a degree that the performance thereof was not influenced. Note that, when the samples were placed in a high-temperature environment, interface peeling was recognized in 70% to 80% of the diffraction zones of the base in two hours standing. Such peeling influences image quality, and when imaging is performed, there is obtained an image of low quality with a degraded contrast, in which white color is emphasized in an entire screen.

FIG. 11 are diagrams evaluating the states of the base 31 and the optical adjustment layer 33 in the second region 32 with a laser microscope. FIG. 11(a) illustrates the state before the standing test, and FIG. 11(b) illustrates the state after standing for 24 hours. Further, regarding a measurement portion, a B portion of FIG. 9 was evaluated. Reference numeral 38 denotes a base surface, and reference numeral 39 denotes an optical adjustment layer surface. An inclined portion 40 is an optical adjustment layer surface in the first region 35.

First, in the state before the standing test illustrated in FIG. 11(a), it can be confirmed that the base surface 38 and the optical adjustment layer surface 39 are substantially parallel to each other, and the base surface 38 is brought into close contact with the optical adjustment layer surface 39 without any gap even when the base surface 38 is flat.

In contrast, in the state after standing for 24 hours illustrated in FIG. 11(b), the optical adjustment layer surface 39 is warped by about 0.019 mm, and a state in which the optical adjustment layer surface 39 peels from the base surface 38 at the interface therebetween can be recognized. Further, when stress balance is remarkably broken during peeling, this stress imbalance may cause cracks in the optical adjustment layer 39.

Note that, such a tendency slightly varies also depending upon a resin to be used in the optical adjustment layer.

Figure 12:
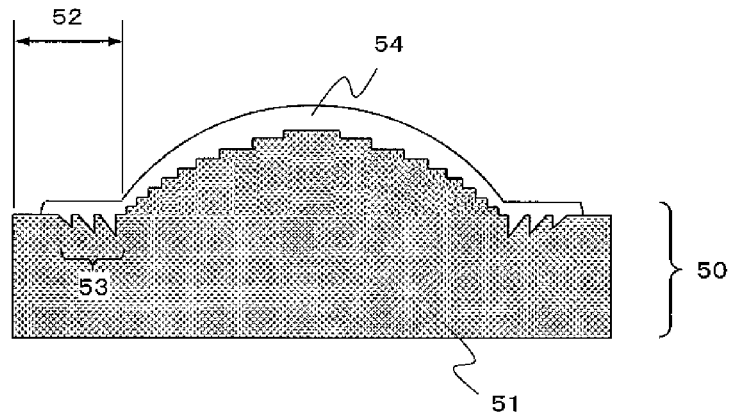
FIG. 12 is a diagram illustrating a diffraction optical element according the embodiment of the present invention.
Figure 13:
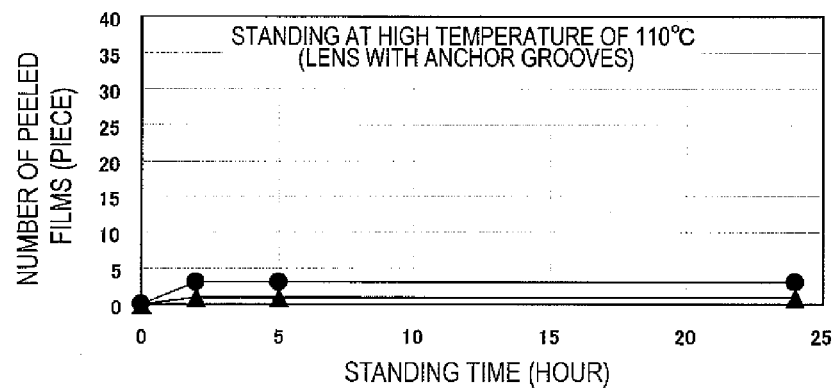
FIG. 13 is a graph evaluating a transition of the number of peeled films of the diffraction optical element according to the embodiment of the present invention.
Figure 14:
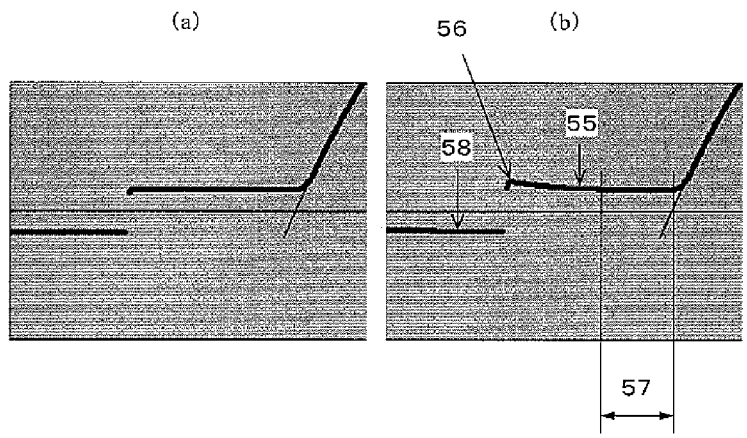
FIGS. 14(a) and 14(b) are diagrams each illustrating a state of the base and the optical adjustment layer in the second region of the diffraction optical element according to the embodiment of the present invention.

FIGS. 12 to 14 are diagrams illustrating results obtained by conducting a similar test to a diffraction optical element 50 using anchor grooves described in detail in the first embodiment. The configuration of the diffraction optical element 50 is the same as that of the diffraction optical element 100.

FIG. 12 illustrates a cross-sectional shape of the diffraction optical element 50. In a second region 52 of a base 51, anchor grooves 53 described in detail in FIG. 2 are formed at an interface between the base 51 and an optical adjustment layer 54.

FIG. 13 is a graph evaluating a transition of the number of peeled films. Although an increase in number of peeled films from one to about three after standing for 24 hours was recognized, it was confirmed that there was a much more remarkable suppression effect to peeling, as compared with the results of FIG. 10. Further, such an increase in number of peeled films does not directly influence the performance of imaging.

FIG. 14 is a diagram evaluating the states of the base 51 and the optical adjustment layer 54 in the second region 52 with a laser microscope. FIG. 14(a) illustrates the state before a standing test, and FIG. 14(b) illustrates the state after standing for 24 hours. Reference numeral 58 denotes a base surface, and reference numeral 55 denotes an optical adjustment layer surface. A remarkable difference is recognized between the state after standing for 24 hours in FIG. 14(b) and the state in FIG. 11(b).

In FIG. 14(b), when the optical adjustment layer surface 55 is paid attention to, it is recognized that a tip end 56 of the optical adjustment layer 54 is warped by about 0.005 mm. However, an anchor groove formation surface 57 is parallel to the base surface 58, and this state has not changed from that before the standing test in FIG. 14(a). Thus, it can be confirmed that the anchor groove formation surface 57 and the base surface 58 are kept in close contact with each other satisfactorily. That is, in the anchor groove portions, it can be determined that the base and the optical adjustment layer are strongly kept in close in contact with each other.

As described above, the diffraction optical element with anchor grooves formed thereon of the present invention has a structure useful for overcoming peeling and cracks.

Next, an example and a comparative example of a diffraction optical element are described.

Example 1

As a specific example of the present invention, a base 1 illustrated in FIGS. 1 and 2 was produced.

A polycarbonate resin (refractive index of d line: 1.585, Abbe number: 28) was used as a first resin of a first optical material constituting the base 1, and the first optical material was subjected to injection molding to produce the base 1.

A groove depth of an anchor groove D1 was set to 0.01 mm, a groove depth of an anchor groove D2 was set to 0.075 mm, and a groove depth of an anchor groove D3 was set to 0.005 mm. Further, regarding a formation pitch between the grooves, the anchor groove D1 was formed at a position at a distance of 0.01 mm from an interface 7 between a first region 5 and a second region 6 as a reference. The anchor grooves D1 and D2 and the anchor grooves D2 and D3 were respectively formed at a pitch of 0.025 mm, respectively (dimensions are shown). Further, the anchor grooves 3 formed at this time have a groove shape in which only one side is tilted at 40°.

An optical adjustment layer 9 in which a zirconium filler was dispersed in a UV-curable resin was formed on the base 1 by molding. As the UV-curable resin, an acrylate resin (refractive index of d line: 1.600, Abbe number: 33) was used.

The optical adjustment layer 9 filled the anchor grooves 3 without any gap, and the base 1 and the optical adjustment layer 9 exhibited satisfactory adhesive strength.

Comparative Example 1

A diffraction optical element of Comparative Example 1 was produced by the same method as that of Example 1. A difference from Example 1 lies in that the three anchor grooves were formed to have a uniform depth of 0.016 mm.

In an experiment, an optical adjustment layer was molded through use of a base having three anchor grooves with a uniform depth of 0.016 mm, the optical adjustment layer after molding was peeled from the base and inverted, and a height from a bottom surface to a tip end of a protrusion (intrusion amount to the anchor grooves) was actually measured with a laser microscope.

Consequently, as shown in FIG. 4, it is understood that only the anchor groove D1 on the first region side was filled up to a height equal to a groove formation depth, and the optical adjustment layer intruded up to a tip end portion of a bottom of the anchor groove D1 to be cured.

In contrast, in the anchor grooves D2 and D3 on the outer circumferential side, the intrusion amounts to the anchor grooves were 0.015 mm and 0.014 mm, respectively. The intrusion amount decreased gradually, and the anchor grooves were not filled completely. Considering that the maximum adhesive strength is exhibited at a time when the grooves are filled with the optical adjustment layer 9 without any gap, it is considered that the adhesive strength in the anchor grooves D2 and D3 are inferior to that of the anchor groove D1 in such a state.

INDUSTRIAL APPLICABILITY

The present invention is particularly useful in the fields of a diffraction optical element and a production method therefor.

REFERENCE SIGNS LIST 1, 31, 51, base
2, 36 diffraction grating
3, 53, D1, D1, D3 anchor groove
3a convex portion
4 axis center
5, 35 first region
6, 32, 52 second region
7 interface
8 opening
9, 33, 54 optical adjustment layer
10 raw material for optical adjustment layer
10a, 10b flow of raw material for optical adjustment layer
11 mold
12 curved portion
13, 14 base abutment surface
15 light source
16 UV-light
20 anchor groove having cross-sectional shape approximate to inverted equilateral triangle
21 flat plane
22 rising wall
23 rising wall
24 rectangular anchor groove
25 curved anchor groove
30, 50, 100 diffraction optical element
34 plane
37 diffraction grating close to second region
38, 58 base surface
39, 55 optical adjustment layer surface
40 inclined portion
56 tip end of optical adjustment layer
57 anchor groove formation surface

The invention claimed is:

1. A diffraction optical element, comprising:
a base made of a first optical material containing a first resin, the base having a diffraction grating shape on a surface thereof; and
an optical adjustment layer made of a second optical material containing a second resin, the optical adjustment layer being formed on the diffraction grating shape of the base,
wherein the base includes a first region having the diffraction grating shape on a surface thereof, and a second region positioned outside the first region,
wherein the optical adjustment layer is formed so as to cover the first region and at least a part of the second region,
wherein the second region has a plurality of anchor grooves formed therein,
wherein a part of a surface of the second region has a planar shape, and the anchor grooves have a recessed shape with respect to the planar shape, and
wherein a depth of an anchor groove of the plurality of anchor grooves, which is positioned on an outermost side, is smaller than a depth of another anchor groove of the plurality of anchor grooves, which is positioned on an innermost side.

2. The diffraction optical element according to claim 1, wherein, in the plurality of anchor grooves, the anchor groove positioned on the innermost side is deepest, and anchor grooves positioned on an outer side become shallower.

3. The diffraction optical element according to claim 1, wherein a depth of a deepest anchor groove of the plurality of anchor grooves is 0.05 mm or less.

4. The diffraction optical element according to claim 1, wherein the plurality of anchor grooves each have a concentric shape in which an axis center thereof substantially matches with an axis center of the diffraction grating shape.

5. The diffraction optical element according to claim 1, wherein the first region has a convex cross-sectional shape and wherein a cross-sectional shape of a surface of the optical adjustment layer has substantially the same shape as an envelope curve connecting tip ends of diffraction step differences of the diffraction grating shape in the first region and has a substantially planar shape along a shape of the base in the second region.

6. The diffraction optical element according to claim 1, wherein the optical adjustment layer has such a thickness that a length from an envelope curve connecting tip ends of diffraction step differences of the diffraction grating shape to a surface of the optical adjustment layer in a normal direction is 0.05 mm or less.

7. The diffraction optical element according to claim 1, wherein the first optical material comprises a material having a lower refractive index and higher dispersion as compared with the second optical material.

8. The diffraction optical element according to claim 1, wherein the second optical material comprises a composite material containing a resin and inorganic particles.

9. The diffraction optical element according to claim 8, wherein the inorganic particles contain, as a main component, at least one kind of oxide selected from the group consisting of zirconium oxide, yttrium oxide, lanthanum oxide, alumina, and silica.

10. The diffraction optical element according to claim 1, wherein the first optical material holds a relationship of Expression (2) with respect to the second optical material and a depth d of the diffraction grating in an entire wavelength region to be used;

$$0.9d \leq \left| \frac{m \cdot \lambda}{n1(\lambda) - n2(\lambda)} \right| \leq 1.1d. \tag{2}$$

11. The diffraction optical element according to claim 1, wherein the second region does not have a protruding shape with respect to the planar shape.

* * * * *